United States Patent Office 3,100,727
Patented Aug. 13, 1963

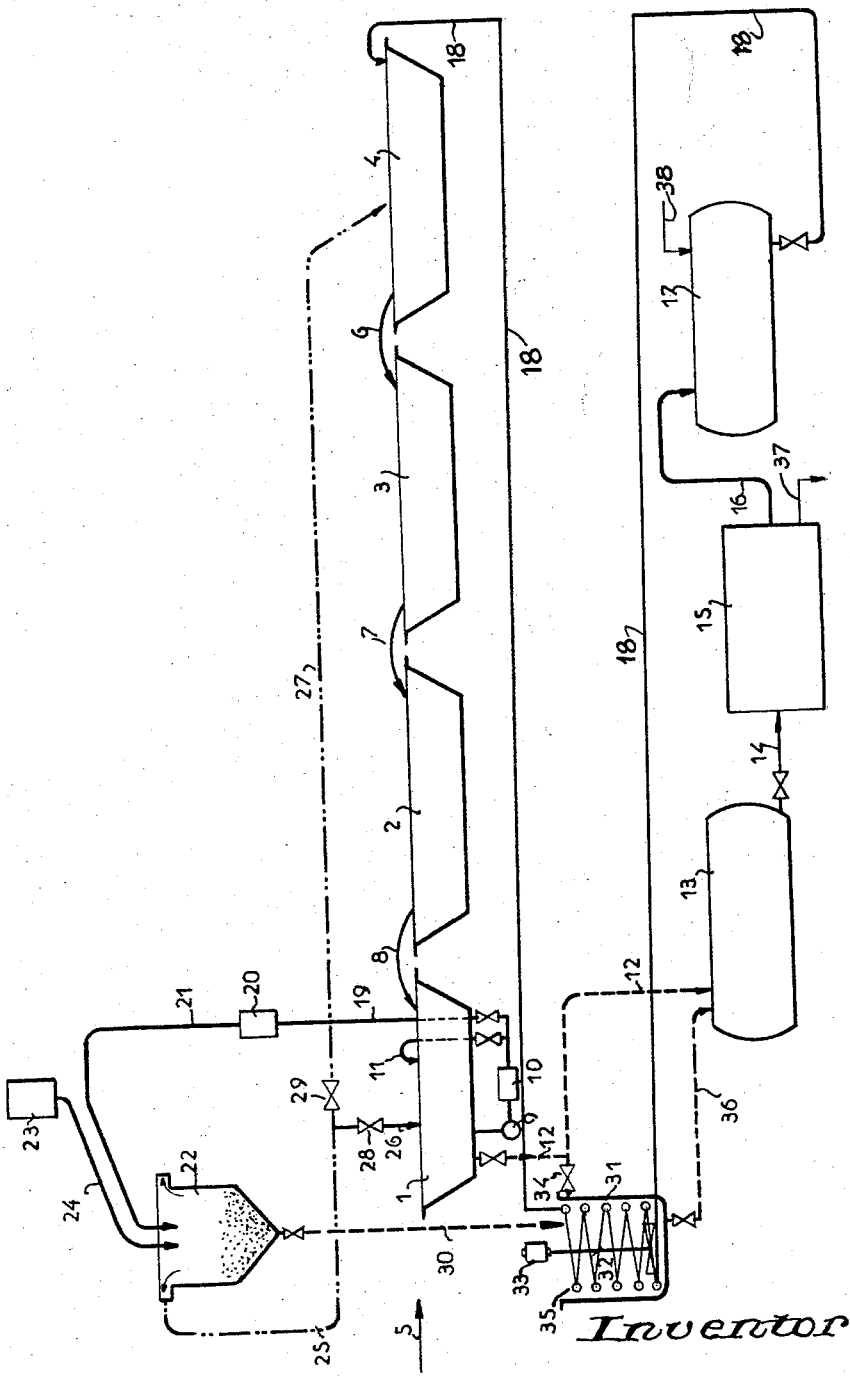

3,100,727
METHOD AND APPARATUS OF AUTOMATICALLY CONTROLLING A SULFURIC ACID TREATMENT PLANT FOR FERROUS MATERIALS
Jean Louis Albert Labergère, Montreuil-sous-Bois, France, assignor to Societe O'Fakler & Cie, Montreuil-sous-Bois, France, a company of France
Filed June 24, 1960, Ser. No. 38,611
Claims priority, application France June 26, 1959
11 Claims. (Cl. 134—13)

This invention relates to processes for treating ferrous metals with sulfuric acid solution as for pickling and the like treatments, and is more especially concerned with an improved method of automatically controlling such processes so as to maintain the iron content in the solution below a prescribed level.

In the pickling and similar treatments of ferrous metals in sulfuric acid baths, it is necessary in order to achieve satisfactorily high output rates to use baths having comparatively high sulfuric acid concentrations and maintain the bath temperature at a comparatively high level. However the use of such operating conditions involves certain difficulties, in that there is a tendency to the formation of iron sulfate monohydrate should the iron content in the bath exceed a certain critical concentration, which increases with the said concentration and the temperature of the bath. Such difficulty is generally present in all pickling installations regardless of whether they are batch installations using separate pickling tanks or continuous systems using a series of tanks through which the articles are successively passed.

The usual way to prevent formation of iron sulfate monohydrate comprises maintaining the iron content in the bath at a low value, usually within the approximate range of from 60 to 70 grams iron per liter, sufficiently remote from the critical concentration corresponding to the normal operating conditions used, in order that there will be no substantial danger of such critical concentration being attained at any time throughout the process.

It has been found that the pickling rate is not significantly modified when the iron content in a pickling bath attains a value corresponding to monohydrate formation provided the acid concentration is maintained within an appropriate range. The occurrence of iron monohydrate deposit in the pickling tanks is troublesome since the deposit shows a strong tendency to agglomerate and cling to the tank walls and bottom and has to be removed with picks or similar tedious mechanical methods. The use of pickling baths having high iron concentrations is especially advantageous in continuous pickling processes in that it permits closed-cycle operation. That is, the pickling solutions are regenerated at a sulfating station by a series of treatments resulting in a crystallization of the iron sulfate content therein and its removal out of the solution. The sulfuric acid content in the bath is adjusted and the thus regenerated solution is continuously recycled into the flow circuit.

In this way it has been possible to operate continuous pickling plants under such conditions that the bath having the highest iron concentration of the series has values of iron and acid concentrations and temperature relatively close to the range in which the monohydrate will form. Such plants will operate quite satisfactorily but they require permanent and strict supervision to prevent the formation of monohydrate in the tanks.

It is an object of this invention to obviate this difficulty and to provide improved means whereby high concentration baths may be used under substantially optimum conditions of highest efficiency and output rate without at any time exceeding in the bath the maximum permissible iron concentration.

The invention therefore has as its object the provision of a method of automatically controlling a sulfuric acid treatment plant for ferrous metals so that the iron content in the bath will not attain a value at which iron sulfate monohydrate is liable to form in the treating zone. The method of the invention involves withdrawing a predetermined portion of the treating solution, subjecting the withdrawn portion to conditions causing precipitation as iron sulfate monohydrate of any iron present in the liquid in excess of the permissible range, separating the precipitate and recycling the solution into the system.

According to the invention, in order to cause precipitation of monohydrate in the withdrawn solution, a simple and satisfactory treatment comprises heating the withdrawn solution and/or adding sulfuric acid, thereto.

The proportion of the solution that is withdrawn and exposed to the precipitation treatment is so predetermined that the application of heat and/or addition of sulfuric acid will substantially compensate for the normal losses of heat and acid from the process solution during normal operation. In accordance with the invention it has been found that it is practicable to maintain thereby the iron content in the process solution so as to prevent positively the formation of iron sulfate monohydrate therein. The monohydrate precipitate formed in the process of the invention may be separated from the withdrawn fraction of solution by any conventional technique as by filtering, settling, centrifuging or the like.

Desirably the precipitation treatment of the invention is performed in apparatus that is separate from the pickling plant proper, and connected therewith through suitable lines through which the predetermined fraction of solution is cycled with suitable pumping means. However, the invention also comprises those embodiments wherein the precipitation treatment is performed within a part of the pickling tank remote from the main part thereof in which the articles to be pickled or otherwise processed are immersed and separated therefrom by suitable means such as perforate partitions or grating, to prevent the monohydrate precipitate from contaminating the main part of the tank.

The monohydrate formed and collected during the treatment is utilized according to an important aspect of the invention in order to promote the crystallization of iron sulfate heptahydrate in the spent solutions during regeneration thereof. For this purpose the monohydrate is dissolved in the spent solution before the latter is treated for crystallizing the sulfate.

An exemplary embodiment of the invention will now be described for purposes of illustration but not of limitation with reference to the accompanying drawing which is a flowsheet diagram of plant constructed to operate in accordance therewith.

The plant diagrammatically illustrated comprises four pickling tanks 1, 2, 3 and 4 connected in series, each tank may contain e.g. 40 cubic meters of sulfuric acid solution. Articles to be processed e.g. steel strip, are passed through the tanks 1, 2, 3, 4 in that order, and then discharged to any further treating plants such as rinsing, drying and so on, not shown. The last tank 4 is continually supplied with make-up solution which may be fresh and/or regenerated solution, and thence passes through overflow means as indicated by arrows 6, 7 8 to the other tanks in the order 4, 3, 2, 1.

In the plant shown only the initial tank 1 which is the tank having highest iron concentration is provided with the means of this invention for maintaining the iron content therein at the highest possible values less than that at which iron sulfate monohydrate would be liable to form.

Assuming for example it is desired to use a pickling solution containing 300 grams per liter free sulfuric acid, then if the iron content is about 74 g./l. the monohydrate will first form at a temperature of about 99° C., but if the iron content is increased to 79 g./l. it will already form at about 93° C., and if the iron content is increased to 86 g./l. it will form at about 88° C. Thus a satisfactory set of conditions comprises a bath containing 300 g./l. free $H_2SO_4$ and 80 g./l. iron at a temperature of 85° C. The strip enters the bath in tank 1 in a comparatively cool condition which lowers the temperature in the tank; normal heat losses due to radiation and the like further contribute to lowering the bath temperature. It is therefore necessary to use reheating means for maintaining the desired bath temperature of about 85° C. For this purpose, the tank may be provided with four pumps such as 9 which draw off the solution from the tank and discharge it through a heat exchanger 10 and deliver the reheated solution into the tank through a line 11. Each pump, in one specific embodiment, may have a delivery rate of 40 to 50 cu. m. hr. The exchangers may be conventional counterflow carbon exchangers and may be fed with steam at a pressure of about 3 or 4 kg./sq. cm., with a maximum temperature of 170° C. at the hottest spot of the exchanger circuit. The flowrate of the solution through such exchangers should be fast enough to prevent any precipitation of the monohydrate in the exchanger and associated conduits. The outlet temperature of the solution from the exchanger may satisfactorily attain a value of about 92° C. which is just below the temperature at which iron sulfate monohydrate will form from a solution containing 80 g./l. iron and 300 g./l. free sulfuric acid. A take off line 12 serves to discharge a predetermined quantity of spent solution from tank 1 into a reservoir 13. Assuming for instance that the plant is to handle 60 tons steel strip per hour, the spent solution may be withdrawn at the rate of about 8 cu. m./hr. through line 12. The spent solution from reservoir 13 is delivered to a sulfating station 15 over a line 14.

The sulfating station 15 may be of conventional type and comprise vacuum concentrating and cooling means operative to cause a precipitation of iron sulfate heptahydrate. The heptahydrate precipitate is separated from the solution, e.g. by centrifuge, and discharged through line 37. The solution is preferably filtered and flows through a line 16 into a reservoir 17. Make-up sulfuric acid may be added to the solution at or ahead of reservoir 17 by line 38 to adjust the acid content. The regenerated solution is reheated and recycled over line 18 into tank 4.

The plant so far described is a more or less conventional closed cycle continuous pickling system in which the normal expenditure and losses in acid and heat are continuously compensated for by the supply of make-up acid and heat. In such a system, the characteristics of the solution have heretofore had to be narrowly supervised to prevent the temperature and/or the iron content and/or acid concentration from rising above prescribed values at which iron sulfate monohydrate would precipitate in the tanks and conduits of the system. In accordance with the invention, such monitoring action is automatically performed by the provision of the means now to be described.

Solution withdrawn from tank 1 by means of one of the pumps 9 is delivered into an exchanger 10 and thence through a line 19 into a further exchanger 20, whence the solution at a temperature of about 99° C. is added by way of a line 21 into a settling tank 22. The exchanger 20 and line 21 are dimensioned large enough, and the rate of flow of the solution therethrough should be high enough, to prevent any substantial depositing of the monohydrate, tending to form at the increased temperature, from settling in substantial quantities over the walls of the exchanger and conduits. The settling tank 22 is a conventional settling tank with a conical bottom and is heat lagged; its capacity may be about 20 cu. m. and it is fitted with a hood and stack for the discharge of vapour. The tank 22 may be made of brick-lined sheet steel or hardened lead. Heating means may be provided for tank 22 if desired. Sulfuric acid is preferably added to the solution in settling tank 22 through line 24 from overhead tank 23 further to promote the precipitation of the monohydrate therein, and the amount of acid thus added may correspond substantially to the amount of acid consumed in tank 1, or, in the entire plant. By way of example, if 60 tons steel strip per hour are to be processed, which output corresponds substantially to an amount of 300 kg. iron dissolved per hour, the acid consumption in tank 1 is about of 120 kg./hr., and the same amount of acid may be added through line 24 into the settling tank 22. This addition of acid has a twofold action in promoting the precipitation of the monohydrate. First it acts by elevating the free sulfuric acid concentration in the bath and, secondly, by elevating the bath temperature owing to the heat developed on dissolution of the acid in the solution. The monohydrate settles to the bottom of tank 22 while the supernatent solution, wherein the iron content has now been reduced to say about 74 g./l., is recycled through line 25 and line 26 into tank 1. A branch line 27 makes it possible when and as desired to direct part or all of the clear solution to one or more other of the tanks of the set, e.g. tank 4 as shown, the relative rates of recycling to the respective tanks being adjustable by means of valves such as 28 and 29. The clear solution from settling tank 22 is at a temperature of about 98° C. and contributes to the reheating of the processing solution.

The monohydrate settling in the bottom of tank 22 is directed through a line 30 into a redissolving tank 31 provided with a rotary stirrer 32 driven from a motor 33. Tank 31 is further supplied through a valve 34 with spent solution derived from tank 1 through the outlet line 12. The monohydrate is thus redissolved in the tank 31 with the relatively cool spent solution. The spent solution may be cooled through any suitable means, e.g., by allowing a batch of the solution to cool off naturally in the tank 31 between two consecutive redissolving steps or more preferably by providing forced cooling means of conventional character whereby fully continuous operation will be made possible.

Dissolution of the monohydrate in the spent solution is accompanied by an evolution of heat which is recovered by providing in tank 31 a heat exchange coil 35 through which a fluid to be reheated is made to flow. According to an advantageous feature of the invention, coil 35 is used to reheat the regenerated solution recycled from reservoir 17 through line 18 to tank 4, for which purpose the coil 35 is interposed in the recycling line 18. Coil 35 may also serve to cool the solution in tank 31 and thereby facilitate the dissolution of the monohydrate.

The enriched solution in which the monohydrate has thus been redissolved is discharged from tank 31 through a line 36 into the spent solution reservoir 13 whence it is discharged as previously noted to the sulfating station 15, together with the spent solution in admixture therewith.

It will be seen that in the system described, the iron concentration in the solution contained in tank 1 will at all time be maintained at a value lower than that at which monohydrate can precipitate. The settling tank 22 may be regarded as a "safety-valve" device in which excess monohydrate precipitates to be removed from the solution as soon as the iron content in the solution attains a value sufficiently near the critical value at which monohydrate can form at the temperature and acid concentration of the solution in the general flow-circuit. A regulating device of this character will operate practically without any supervision, and is of especial advantage in a continuous pickling process of the type described, though it would clearly be applicable to batch processes as well. The entire system described including the regulating arrangement of the invention operates as a fully closed-circuit system with a maximum efficiency in the recovery both of valuable constituents and heat, greatly enhancing the economy of the process.

Various modifications may of course be made in the details of the method and plant described and shown without exceeding the scope of the invention. Thus the serially arranged exchangers 10 and 20 may be replaced by a single exchanger or omitted, with the solution being directly heated inside the monohydrate settling tank 22 by conventional heating means. Further, the monohydrate may be precipitated without heating by simply adding sufficiently large amounts of acid into the settling tank continuously or at predetermined intervals. The precipitated monohydrate may be discarded in part or in whole after separation from the solution by filtering or other means. One, two or more tanks of the pickling plant may be provided with the regulating arrangements of the invention for controlling the iron content therein. All temperatures, concentrations and other numerical values indicated herein are purely illustrative and are not to be held as restricting the scope of the invention.

What is claimed is:

1. Method of controlling a sulfuric acid treatment plant for ferrous materials, which comprises passing said ferrous materials through a bath of sulfuric acid solution, withdrawing a portion of said solution, and precipitating ferrous sulfate monohydrate therefrom, separating the monohydrate precipitate and recycling the clarified solution into said bath, withdrawing a further portion of the solution from said bath and dissolving at least part of the separated monohydrate therein to increase the ferrous content of said further portion of the solution, thereby generating heat, exposing said further portion of the solution to crystallizing conditions for precipitating iron sulfate heptahydrate therefrom, separating said heptahydrate to provide a regenerated solution, reheating said regenerated solution, and recycling the reheated regenerated solution into said bath.

2. Method of automatically controlling the treatment of ferrous metal articles with sulfuric acid in a closed-cycle system, comprising passing the articles through a series of baths of sulfuric acid solution, withdrawing a portion of said solution from an initial bath of said series having a maximum iron content therein, heating and adding acid to the withdrawn solution to cause a precipitation of iron sulfate monohydrate therefrom, separating the monohydrate and recycling the clarified solution into at least said initial bath, withdrawing a further portion of the solution from said initial bath, dissolving therein said monohydrate precipitate to increase the ferrous content of said further portion and generate heat, exposing said further portion of the solution to crystallizing conditions for precipitating iron sulfate heptahydrate therefrom, separating the heptahydrate from solution and adding acid to said solution to readjust the acid content thereof and provide a regenerated solution, reheating said regenerated solution and recycling the reheated regenerated solution into a bath of said series.

3. The method of claim 1, which includes the step of exposing said first withdrawn portion of the solution to a sedimentation step to separate the monohydrate precipitate therefrom.

4. The method of claim 1, which includes centrifuging the first withdrawn portion of the solution to separate the monohydrate precipitate therefrom.

5. The method of claim 1, which includes filtering the first withdrawn portion of the solution to separate the monohydrate precipitate therefrom.

6. The method of claim 1, in which said precipitating is caused by increasing the temperature of said withdrawn portion of solution.

7. The method of claim 6, which includes heating the first withdrawn portion of the solution to a temperature not less than about 100° C. for precipitating the monohydrate therefrom.

8. The method of claim 1, in which said precipitating is caused by adding acid to the withdrawn portion of solution.

9. The method of claim 1, in which said precipitating is caused by increasing the temperature of said withdrawn portion of solution and by adding acid thereto.

10. In apparatus for pickling ferrous metal with pickle liquor and for regenerating the used pickle liquor, the combination with a plurality of interconnected pickling tanks adapted to successively receive said metal, crystallizing means connected to the first pickling tank to regenerate used pickle liquor received therefrom, and means to conduct regenerated pickle liquor from said crystallizing means to the last pickling tank, a settling tank connected to said first pickling tank to receive pickle liquor therefrom, means for precipitating ferrous sulfate monohydrate from the pickle liquor conducted to said settling tank, means to selectively conduct clear pickle liquor from said settling tank to said first pickling tank and to said last pickling tank, a dissolving tank having agitator means therein, means to conduct used pickle liquor from said first pickling tank to said dissolving tank, means to conduct the separated precipitate from said settling tank to said dissolving tank to dissolve said precipitate within and thereby increase the ferrous content of the used pickle liquor in said dissolving tank, and means to conduct the used pickle liquor of increased ferrous content from said dissolving tank to said crystallizing means.

11. Apparatus according to claim 10, in which said means to conduct regenerated pickle liquor from said crystallizing means to said last pickling tank includes a heat exchanger coil located in said dissolving tank whereby the used pickle liquor in said dissolving tank is cooled by the regenerated pickle liquor advancing within said coil and gives up heat to said advancing liquor to bring it substantially to service temperature.

References Cited in the file of this patent
UNITED STATES PATENTS

| | | |
|---|---|---|
| 1,146,071 | Hoffman | July 13, 1915 |
| 1,589,610 | Marsh et al. | June 22, 1926 |
| 2,662,812 | Shaw | Dec. 15, 1953 |
| 2,668,130 | Martin | Feb. 2, 1954 |
| 2,709,143 | Francis et al. | May 24, 1955 |